June 8, 1965  J. F. CHIAMPARINO  3,188,069
FLAME CUTTING AND BEVELING MACHINE
Filed Dec. 19, 1961  2 Sheets-Sheet 1
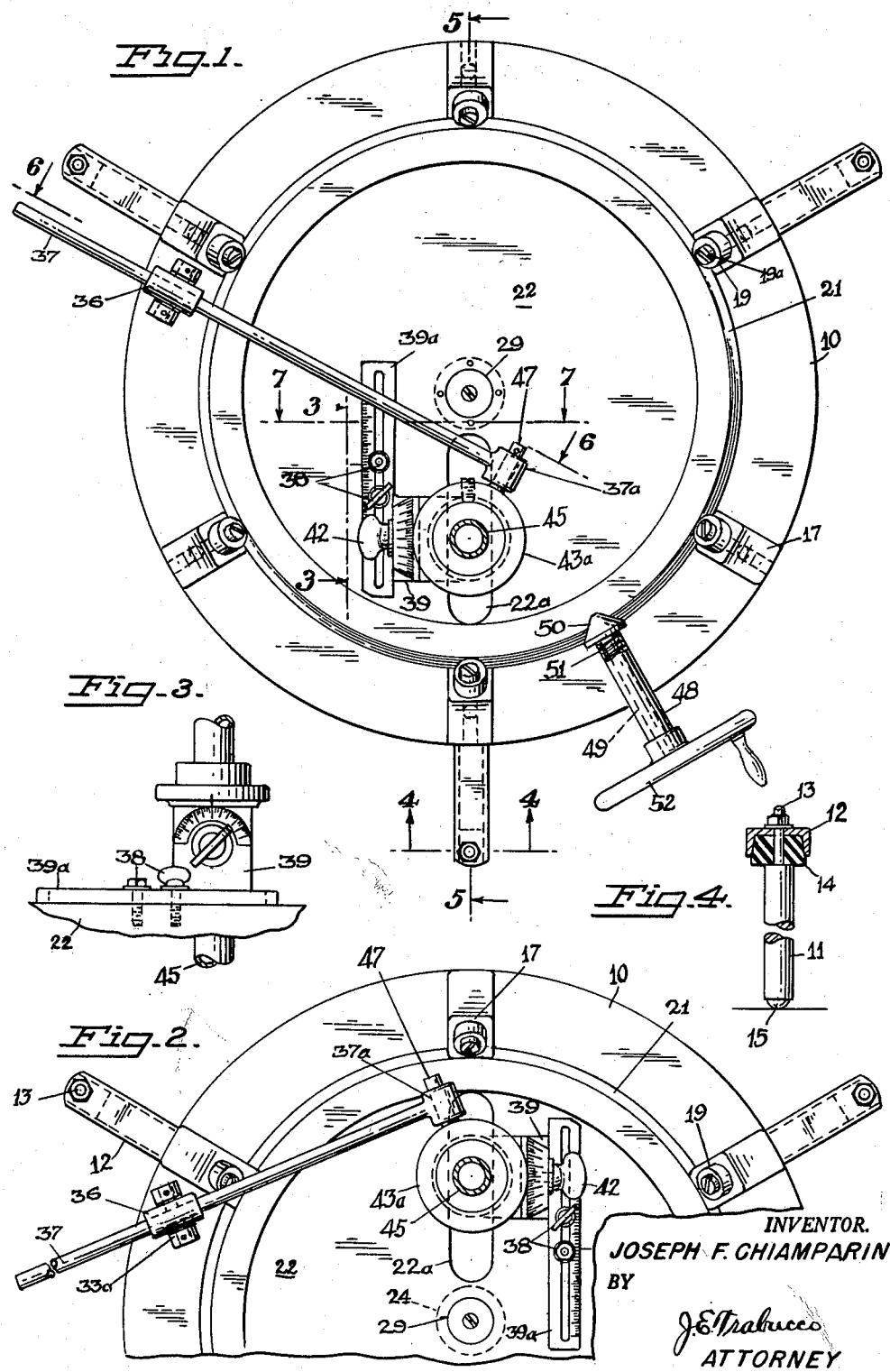
INVENTOR.
JOSEPH F. CHIAMPARINO
BY
J. E. Trabucco
ATTORNEY June 8, 1965
J. F. CHIAMPARINO
3,188,069
FLAME CUTTING AND BEVELING MACHINE
Filed Dec. 19, 1961
2 Sheets-Sheet 2
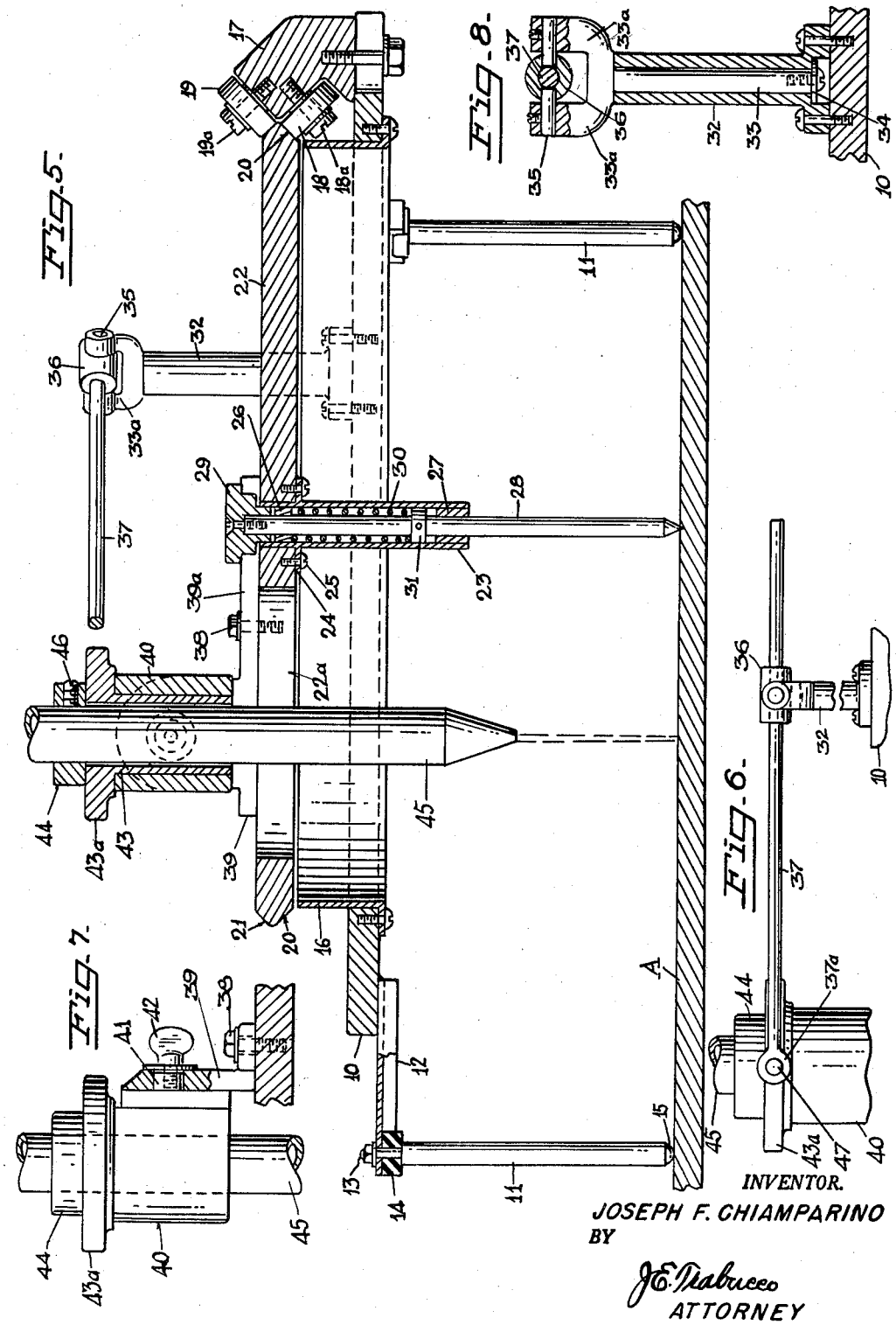
INVENTOR.
JOSEPH F. CHIAMPARINO
BY
J.E. Fabruceo
ATTORNEY

United States Patent Office 3,188,069
Patented June 8, 1965

3,188,069
FLAME CUTTING AND BEVELING MACHINE
Joseph F. Chiamparino, 1260 Athens St.,
San Francisco, Calif.
Filed Dec. 19, 1961, Ser. No. 160,564
4 Claims. (Cl. 266—23)

This invention relates to flame cutting apparatus designed to cut beveled kerfs from a metal plate or workpiece.

The present invention provides a portable flame cutting machine adapted to be supported on a metal plate or other workpiece from which circular kerfs or discs are to be cut. The machine embodies means by which a torch may be actuated circularly during the cutting operation. The present invention also comprises novel supporting means for the torch which makes possible the selective angular positioning of such torch so the cut-out kerfs may be provided with peripheral beveled edges of predetermined inclination. Another important feature is the provision of novel torch supporting means which makes it possible for the torch to travel circularly above the workpiece without the flexible gas conveying conduit connected to the torch becoming twisted or tangled.

It is therefore the primary object of this invention to provide an improved machine of the kind characterized adapted to support an adjustable torch for cutting circular kerfs from the workpiece beneath.

Another object of the present invention is the provision of a novel machine of the kind characterized having torch supporting means which avoids the twisting of the hose supplying inflammable gas to the torch when such torch is moved circularly above the workpiece.

Other and further objects of my invention will be pointed out hereinafter or will be indicated in the appended claims or will be obvious to one skilled in the art upon an understanding of the present disclosure. For the purpose of this application, I have elected to show herein certain details of a flame cutting and beveling machine which is representative of my invention; it is to be understood, however, that the embodiment of my invention herein shown and described is for purposes of illustration only and that therefore it is not to be regarded as exhaustive of the variations of the invention in the art.

In the accompanying drawings:

FIG. 1 is a plan view of a machine embodying my invention;

FIG. 2 is a plan view of a fragmentary part of the machine, showing the torch supporting means in a different position;

FIG. 3 is a side elevational view of means indicating the degree of inclination of the torch;

FIG. 4 is a sectional view taken on the line 4—4 of FIG. 1;

FIG. 5 is a sectional view on an enlarged scale, taken on the line 5—5 of FIG. 1;

FIG. 6 is an elevational view taken on the line 6—6 of FIG. 1;

FIG. 7 is a sectional view taken on the line 7—7 of FIG. 1; and

FIG. 8 is a detail view showing the supporting means for an end portion of the guide rod.

Referring to the drawings, the numeral 10 designates a suitably constructed frame, preferably of circular shape, adapted to be supported above the workpiece A by a plurality of uniformly spaced legs 11 attached to outwardly disposed extensions 12 secured to the frame. The upper ends of the legs are formed with threaded openings for receiving screws or bolts 13 extending through the extensions 12 and rubber pads 14 which are interposed between the upper ends of the legs and such extensions. The legs are preferably provided with rubber tips 15 which engage with the workpiece and normally prevent the displacement of the frame.

Attached as by screws to the frame 10 is a ring-shaped guard 16. Secured as by bolts to the peripheral edge portions of the frame 10 are a plurality of uniformly spaced roller supporting members 17, each of which support rollers 18 and 19, the former being mounted for rotation about axial shafts or bolts 18a and the latter being mounted for rotation about axial shafts or bolts 19a. The axial shafts 18a and 19a of each set are positioned at approximately forty-five (45°) with respect to each other, and the rollers 18 and 19 which they respectively support are arranged to engage with the beveled converging peripheral surfaces 20 and 21, respectively, of a circular rotatable disc-like torch carrier 22. The lower rollers 18 engaging with the beveled annular surface 20 are arranged in supporting relationship with respect to the carrier 22, while the upper rollers 19 engaging with the beveled annular surface 21 prevent the lateral shifting of the carrier. While any suitable number of rollers may be employed to support the carrier, it has been found that six (6) of such rollers, spaced uniformly apart, will suffice.

Extending vertically through an axial opening in the carrier 22 is a tubular member 23 which is provided with an annular flange 24 which is secured to the carrier as by screws 25. Extending through bushings 26 and 27 secured inside the tubular member 23 is an axial centering pin or shaft 28, the lower pointed end of which is adapted to engage with the workpiece A, and the upper end of which projects above the carrier and is secured to a knob 29. A compression spring 30 positioned in the tubular member 23 is confined between the fixed bushing 26 and a collar 31 secured to the shaft 26. The compression spring 30 urges the shaft downwardly so the pointed end thereof normally seats within a small centering groove or indentation which is usually provided in the workpiece A prior to the commencement of the cutting operation. By means of the knob 29 the shaft 28 may lifted upwardly to disengage the lower pointed end of such shaft from the workpiece to relocate the machine for a succeeding cutting operation.

The stationary frame 10 is of larger diameter than the carrier 22, thereby making it possible for the roller supporting members 17 and an upright bearing supporting means to be mounted on the peripheral portion of the frame in positions wherein they do not interfere with the rotation of the carrier. The bearing supporting means comprises a fixed upright sleeve 32 having a flanged lower end which is secured as by screws to the frame 10. Also comprising a part of the bearing supporting means is a post 33 which is rotatably supported in the sleeve 32. In the embodiment shown on the drawings, the post is formed with an annular shoulder which rests on the upper end of the sleeve, and a metal disc or washer 34 secured by a screw to the lower end of the post is adapted normally to engage with a shoulder on the lower end portion of the sleeve to avoid detachment of the post from the sleeve. The upper end portion of the post 33 is bifurcated as at 33a, 33a to provide means for supporting two (2) horizontally aligned pivot pins 35 which loosely extend into opposed horizontally aligned openings in the sides of a sleeve 36 to thereby engage with and support such sleeve for pivotal movement about a substantially horizontal axis. Slidably supported in the sleeve 36 is a substantially horizontal guide rod 37 having a tubular enlargement 37a on its inwardly disposed end which is formed with its opening positioned substantially horizontal and at right angles to such rod.

Adjustably secured to the carrier 22 as by screws or bolts 38 is an L-shaped torch supporting bracket 39 comprising a vertical or upstanding portion positioned alongside a radially disposed slot or opening 22a arranged eccentrically in the carrier and an elongated slotted substantially horizontal portion 39a which rests upon and is secured to the carrier and is positioned in substantially parallel relation to the slot 22a. The horizontal bracket portion 39a is preferably provided with graduation marks along a longitudinal edge thereof which in association with a fixed mark on the carrier indicates the size of the kerf to be cut from the workpiece. The screws or bolts 38 extend through an elongated longitudinal slot in the bracket portion 39a and are arranged with their heads in engagement with the said portion and their threaded ends connected to the carrier.

Supported on the vertical bracket portion 39 and arranged for adjustment about a horizontal axis is an upstanding sleeve or tubular member 40 which is formed with an outwardly disposed substantially horizontal threaded pivot pin protuberance or member 41 extending through an opening in the bracket. A flanged set screw 42 on the threaded protuberance is adapted to clamp the sleeve in a fixed position on the bracket after such sleeve has been suitably adjusted to a tilted or substantially vertical position. Extending rotatably through the sleeve 40 and supported thereby is a tubular member or bushing 43 having a peripheral flange 43a on its upper end which rests on the sleeve. A collar 44 adjustably secured to a torch 45 by means of a set screw 46 rests on the bushing 43 and holds the torch against displacement in a downward direction. The torch extends through the slot 22a in the carrier and is arranged to direct a flame onto the workpiece beneath. The bushing flange 43a is formed with an outwardly disposed substantially horizontal pivot pin or cylindrical protuberance 47 which loosely extends through and is connected to and is adapted to support the inwardly disposed tubular enlargement 37a of the rod 37.

It is to be noted that the torch 45 is supported for circular movement with the carrier 22 by the assembly comprising the bracket 39, the sleeve 40 and the bushing 43, and that such torch may be adjusted by means of the bracket 39 toward or away from the axial center of the carrier to make possible the cutting of kerfs of different diameters from the workpiece. The torch is also adapted to be tiltably adjusted about a horizontal axis so the cutting or burning flame may be directed downwardly in a predetermined inclined or vertical direction to provide the kerf cut from the workpiece with beveled peripheral edges having a desired slope or inclination. The bracket 39 is preferably provided with suitable arcuately arranged graduation marks, which in combination with an indicator mark preferably on the sleeve 40 or on the peripheral flange 43a indicates the inclination of the torch. Although not shown on the drawings, the torch is supplied with a combustible gas, such as acetylene, from a source of supply by one or more flexible conduits.

Secured as by screws to the peripheral portion of the frame 10 is a radially disposed tubular bearing 48 which rotatably supports a shaft 49. The inner end of the shaft 49 is secured to a cone-shaped friction wheel 50 which engages with the beveled peripheral surface or edge 21 of the carrier 22. Although not shown in detail, a coil compression spring 51 encircling the shaft 49 and arranged with its ends confined between the friction wheel 50 and an internal shoulder on the tubular bearing 48, urges the friction wheel toward and into firm engagement with the beveled peripheral surface 21 of the carrier. A hand wheel 52 secured to the outer end of the shaft provides convenient means for rotating the friction wheel 50 to turn the carrier about its axis, and thus move the torch circularly to cut a circular kerf or disc from the workpiece.

It is to be noted that by means of the mechanism comprising the present invention the torch 45 does not rotate when it is moved circularly, thereby avoiding the twisting of the flexible gas conveying conduits connected thereto. In this respect, the post 33 being rotatable allows the guide rod 37 to swing about a vertical pivot to change its position and to slide back and forth within the pivoted sleeve 36 as the bushing 43 to which such guide rod is pivotally connected travels in a circular path with the rotation of the carrier 22. The torch being supported by the bushing 43, and such bushing being free to rotate in the sleeve 40 does not rotate with the circular movement of the carrier. The sleeve 36 being adapted to pivot about a horizontal axis, slidably supports the shaft while at the same time allowing the position thereof to be changed with respect to the horizontal. Thus the torch may be adjusted to different inclined positions by adjusting the sleeve 40 about the horizontal axis provided by the pivot pin 41 and the set screw 42.

What I claim is:

1. A flame cutting machine comprising a substantially circular frame adapted to be supported above a flat workpiece, a circular carrier mounted for rotary movement on the frame, the carrier having a radially disposed slot therein, rotatable drive means mounted on the frame and arranged in driving relationship with the carrier, a bracket secured to the carrier and aranged alongside the slot, an upstanding tubular member secured to the bracket and arranged for pivotal adjustment about a substantially horizontal axis and also arranged with its opening in vertical alignment with the slot, a tubular bushing rotatably mounted in and supported by the tubular member, a burning torch supported in the bushing, the said torch extending through the slot and positioned to direct a flame against the workpiece, a substantialy vertical post rotatably mounted on the frame, a sleeve mounted on the rotatable post and arranged for pivotal movement about a substantially horizontal axis, and a rod slidably supported in the sleeve, the rod being pivotally connected to the bushing.

2. A flame cuting machine as set forth in claim 1, wherein the bushing and the torch are adjustable about a substantially horizontal axis.

3. In a flame cutting machine, a substantially circular frame adapted to be supported above a workpiece, a circular carrier mounted for rotary movement on the frame, the carrier having an eccentrically disposed opening therein, a bracket secured to the carrier and positioned alongside the opening in such carrier, a tubular member supported on the bracket and arranged above and in registry with the opening in the carrier, a bushing rotatably supported in the tubular member and having flange means resting on such tubular member, a burning torch mounted in the bushing and positioned with its nozzle end portion extending through the opening in the carrier, a rotatable upright post mounted on the peripheral portion of the frame, a substantially horizontal sleeve mounted on the post and arranged for pivotal movement about a substantially horizontal axis extending between the ends of the sleeve, a substantially horizontal rod slidably mounted in the sleeve, the rod being pivotally connected at one end thereof to the flange means of the bushing, and drive means mounted on the peripheral portion of the frame and arranged in driving relation with the carrier.

4. In a flame cutting machine, a frame adapted to be supported above a workpiece, a circular carrier mounted for rotary movement on the frame, the carrier having a radially disposed slot therein, a concentric centering pin depending from the carrier and engageable with the workpiece, a bracket mounted on the carrier alongside the slot and arranged for radial adjustment on the carrier, a tubular member supported on the bracket and arranged for adjustment about a substantially horizontal axis, the tubular member being positioned above the slot and in registry therewith, a bushing movably supported in the tubular member and having a substantially horizontal pivot pin thereon, a burning torch mounted in the bushing and positioned with its nozzle end portion extending through the slot in the carrier, a rotatable upright post mounted on the frame and rotatable about a substantially vertical axis, a sleeve mounted on the post and arranged for pivotal movement about a substantially horizontal axis extending therethrough between the ends of such sleeve, a rod slidably mounted in the sleeve, the rod being pivotally connected at one end thereof to the pivot pin of the bushing, and drive means mounted on the frame and arranged in driving relationship with respect to the carrier.

References Cited by the Examiner

UNITED STATES PATENTS

| | | | |
|---|---|---|---|
| 2,202,133 | 5/40 | Young | 266—23 |
| 2,463,408 | 3/49 | Millis | 266—23 |
| 2,483,294 | 9/49 | Miner | 266—23 |
| 2,542,473 | 2/51 | Bullman | 266—23 |
| 2,910,289 | 10/59 | Grubish | 266—23 |

FOREIGN PATENTS

| | | |
|---|---|---|
| 111,921 | 12/17 | Great Britain. |
| 154,259 | 11/53 | Australia. |

MORRIS O. WOLK, *Primary Examiner.*

RAY K. WINDHAM, DELBERT E. GANTZ, *Examiners.*